(12) United States Patent
Reuven

(10) Patent No.: US 9,043,762 B2
(45) Date of Patent: May 26, 2015

(54) SIMULATED NETWORK

(75) Inventor: Lior Reuven, Petach-Tikva (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 67 days.

(21) Appl. No.: 13/485,364

(22) Filed: May 31, 2012

(65) Prior Publication Data

US 2013/0326488 A1 Dec. 5, 2013

(51) Int. Cl.
*G06F 9/44* (2006.01)
*H04L 29/12* (2006.01)
*G06F 11/34* (2006.01)

(52) U.S. Cl.
CPC ........ *G06F 9/44* (2013.01); *H04L 61/00* (2013.01); *G06F 11/34* (2013.01); *G06F 11/3495* (2013.01); *G06F 11/3433* (2013.01); *G06F 11/3457* (2013.01)

(58) Field of Classification Search
None
See application file for complete search history.

(56) References Cited

U.S. PATENT DOCUMENTS 6,442,141 B1 * 8/2002 Borella et al. ............ 370/248
8,296,424 B2 * 10/2012 Malloy et al. ............ 709/224

2010/0003923 A1 1/2010 Mckerlich et al.
2010/0268524 A1 10/2010 Nath et al.
2012/0072544 A1 3/2012 Pankratov

OTHER PUBLICATIONS

"Shunra and Soasta Announce Combined Solution for Mobile Application Testing" <http://www.soasta.com/company/news/press-releases/shunra-and-soasta-announce-combined-solution/> Mar. 12, 2012.
"Testing the Performance of Applications Over Wide Area Networks" <http://www.apposite-tech.com/assets/pdfs/LinktropyWhitePaper.pdf> Dec. 2008.

* cited by examiner

*Primary Examiner* — Don Wong
*Assistant Examiner* — Deric Ortiz
(74) *Attorney, Agent, or Firm* — Brooks, Cameron & Huebsch, PLLC

(57) ABSTRACT

Systems, methods, and computer-readable and executable instructions are provided for providing a simulated network. Providing a simulated network can include collecting a number of network parameters for a plurality of locations and determining an application frequency of an application for the plurality of locations. Furthermore, providing a simulated network can include providing a simulated network with the number of network parameters to a number of testers of the application, wherein the number of network parameters are provided proportionally to the application frequency.

20 Claims, 3 Drawing Sheets

SIMULATED NETWORK

BACKGROUND

Applications can have a number of functions and provide various end user conditions when a user is utilizing various networks. Various networks around the world have varying performance capabilities that can affect an application performance.

DETAILED DESCRIPTION

Applications can be sold, distributed, and or utilized throughout various locations around the world. Each of the various locations can have various networks (e.g., wide area network (WAN), local area network (LAN), etc.). A computing device can utilize a network to perform various functions of the application (e.g., communication with a server, downloads, updates, etc.). The various networks can have various network parameters (e.g., latency, packet loss, bandwidth, etc.). The various network parameters of the various networks can make it difficult for testers of an application to experience the same or similar end user experience as a number of customers of the application.

Functions of the application can be affected by the various network parameters. For example, an application can experience slower than expected performance when utilizing a network with a particular set of network parameters. By collecting a number of network parameters from a location where the application is utilized and determine an application frequency for the location, a simulated network with the number of network parameters can be provided to a number of testers of the application. The number of testers of the application can determine application performance utilizing the provided simulated network with network parameters similar to the network parameters of locations where the application is used. By utilizing a provided simulated network with the same or similar network parameters, the number of testers can analyze performance problems of an application that can be caused in part by the network parameters.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

Figure 1:
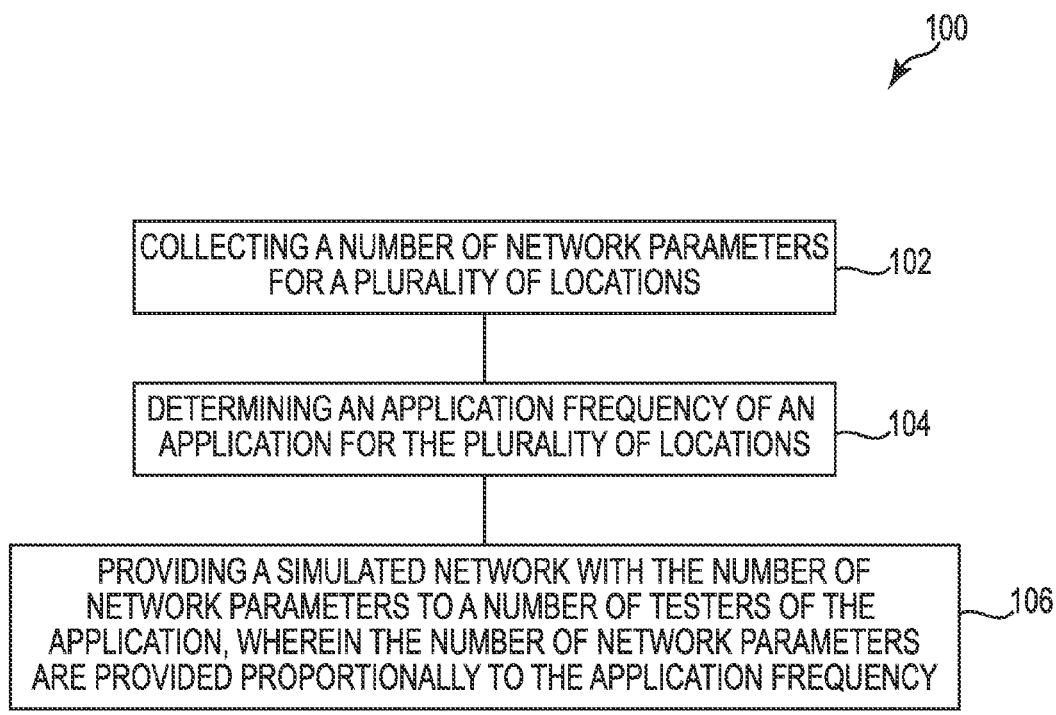
FIG. 1 illustrates a flow chart of an example method for providing a simulated network according to the present disclosure.

FIG. 1 illustrates a flow chart of an example method 100 for providing a simulated network according to the present disclosure. The application can include software (e.g., computer readable instruction, etc.) that can perform a number of functions (e.g., playing media, performing calculations, communication with different computing devices, etc.). The software can be stored on a machine readable medium (MRM) and executed by a processor to perform the number of functions.

At 102 a number of network parameters for a plurality of locations are collected. The number of network parameters can be a number of network properties that can affect application performance. For example, the number of network parameters can include: packet loss, bandwidth, network latency, signal strength, etc. The application performance can include: functionality, response time for requests, how fast transactions are completed by the application, how fast information is delivered to the user of the application, etc.

The number of network parameters can be collected in a variety of ways. For example, the number of network parameters can be collected by a number of monitors (e.g., real user monitor (RUM), network probes, etc.). The number of network parameters can be recorded and/or stored to a storage database (e.g., computer readable medium (CRM), MRM, etc.). The number of network parameters can be retrieved by a number of computing devices to provide a simulated network.

The plurality of locations can include a number of geographical locations. For example the plurality of locations can be a number of cities around the world (e.g., New York, Paris, etc.).

The plurality of locations can also include a number of locations that use the same network. For example, one of the plurality of locations can be an office building that is connected to the same local area network. In this example, each user of the application can experience the same or similar number of network parameters.

The plurality of locations can also include a number of computing devices connected to a number of networks. For example, one of the plurality of locations can be a single computing device connected to a local area network.

The plurality of locations can be based on a preferences and/or settings of a network manager. The network manager can be a computing device as described herein. The network manager can determine a desired location size and/or network size. For example, the network manager can determine that all users of the application within a geographical area can experience the same or similar network parameters.

At 104 an application frequency of an application for the plurality of locations is determined. The application frequency can include a number of applications that are used within the plurality of locations. As described herein, the plurality of locations can be determined by the network manager. Within each of the plurality of locations there can a number of applications that are used by a number of users. For example, within an office building utilizing the same local area network, there can be 50 real users that periodically (e.g., monthly, daily, hourly, etc.) use the application. In another example there can be 1,000 users of the application within a city that the network manager has determined will experience the same or similar number of network parameters. Furthermore, there can be a single user of the application utilizing a single computing device connected to a network. As described herein, the plurality of locations can include an application that is executed by a single computing device utilizing a network. In this example network data and location data can be collected for each application operating on a computing device distributed around the world.

An application frequency can be calculated by comparing a number of users utilizing a particular network to a total number of applications. The application frequency can be a percent of the total number of applications that utilize a number of various networks. For example, if the network manager determines that there are 100 applications utilizing a particular network at a particular location and there are a total of 1,000 applications utilizing various networks at the plurality of locations, then the network manager can determine that the network parameters of the particular network at the particular location has an application frequency of 10 percent.

The network manager can determine the total number of applications that utilize a particular network at a particular location in a variety of ways. The software of the application can comprise a number of monitors that can communicate with the network manager. For example, the number of monitors can determine bandwidth data of a network that is being utilized by the application and transfer the bandwidth data to the network manager.

The number of monitors can also determine location information for the network that is utilized by the application. For example, the number of monitors can determine a geographical location of the computing device that is connected to a particular network and running the application. In this example, the number of monitors can utilize the computing device to transfer the location information to the network manager.

At 106 a simulated network is provided to a number of testers of the application. The simulated network can be provided by the network manager as described herein. The simulated network can include parameters of the number of collected network parameters. For example, the simulated network can include a bandwidth, a packet loss, and a network latency that is similar to or the same as the bandwidth, packet loss, and network latency of a particular location.

The simulated network can be provided to the same percentage of total testers as the application frequency of the location with the same or similar network parameters as the simulated network. For example, if a particular location from the plurality of locations comprises 10 percent of the total number of applications in use, then 10 percent of the number of testers can have the same or similar network parameters as the particular location.

The application frequency can change over time and the network manager can alter the provided simulated network for the number of testers to maintain a proportional number of testers experiencing the same or similar number of network parameters as a number of users that are included in the application frequency. For example, if the application frequency for a particular location and/or network parameters increases, the network manager can increase the number of testers experiencing the same or similar network parameters of the particular location. In the same example, the network manager can increase the number of testers proportional to the increase of the application frequency. A proportional increase in this example can include an increase of the same percentage.

The number of testers can change over time and the network manager can alter the provided simulated network for the number of testers to maintain a proportional number of testers experiencing the same or similar number of network parameters as a number of users of the application. For example, if the number of testers increases by 10 new testers, then the network manager can distribute a simulated network to each of the 10 new testers that is proportional to the application frequency. In this example, if a designated location from the plurality of locations comprises 10 percent of the total number of applications, then one of the 10 new testers would be provided with the same or similar network parameters as the designated location.

The network manager can alter the provided simulated network for the number of testers to address a problem without regard to the application frequency. For example, if a number of users are experiencing problems in a particular area, the network manager can provide a greater number of testers with the network parameters of the particular area even though the application frequency for the particular is low compared to other areas.

The network manager can determine a problem level of a reported number of problems for a particular location. For example, the network manager can receive a number of reported problems from a location with an application frequency that is lower than other locations, if the problems that are reported from the location have a higher problem level compared to other locations, the network manager can provide a greater number of testers with the same or similar network parameters as the location. The problem level can be determined on a number of factors including: if the area is a projected expansion area, if the problem results in a crash of the application, the duration of the problem, etc.

The method described in FIG. 1 can allow a number of testers to experience the application on the same or similar network as the users. By utilizing an application frequency and a number of network parameters for a number of locations, the number of testers can experience the same or a similar network experience while testing and determining a number of problems and/or solutions (e.g., bugs, fixes, updates, etc.).

Figure 2:
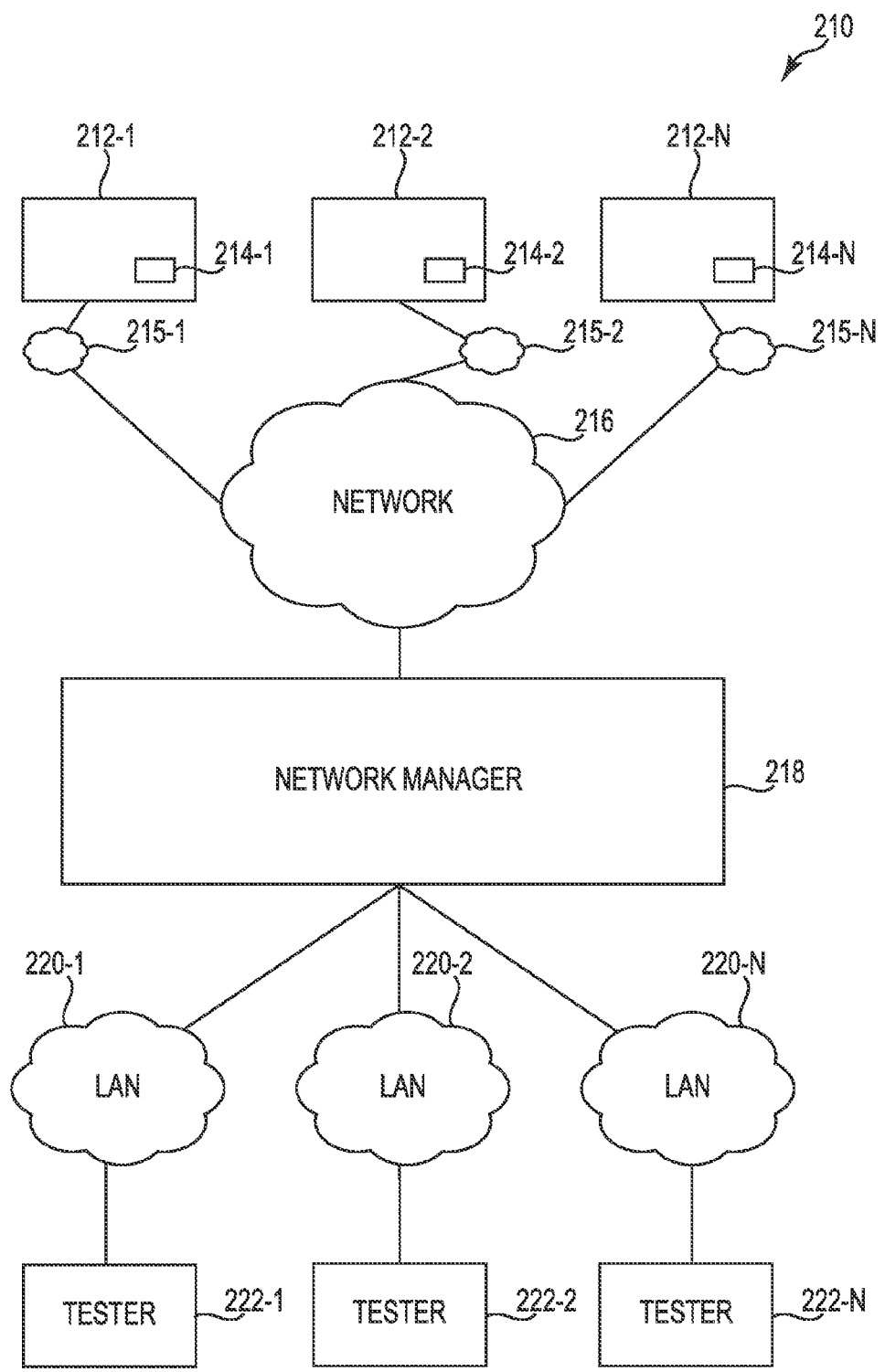
FIG. 2 illustrates a diagram of an example system for providing a simulated network according to the present disclosure.

FIG. 2 illustrates a diagram of an example system 210 for providing a simulated network according to the present disclosure. The system 210 can include a number of applications 212-1, 212-2, . . . , 212-N. As described herein, the number of applications 212-1, 212-2, . . . , 212-N can be located in a number of different locations and be utilizing a number of different networks 215-1, 215-2, . . . , 215-N. For example, application 212-1 can be located in and/or utilizing a network in New York City and application 212-2 can be located in and/or utilizing a network in Los Angeles.

Each of the number of applications 212-1, 212-2, . . . , 212-N can include a number of monitors 214-1, 214-2, . . . , 214-N. The number of monitors 214-1, 214-2, . . . , 214-N can be included within the software of the application as described herein. For example, CRI can be written into the application code that when executed by a processor can perform a number of functions (e.g., determining bandwidth, determining location, sending data, etc.). The number of functions can include determining a bandwidth of the network that is being utilized by the application. In another example, the number of functions can include determining a geographic location and sending geographic location data to a network manager 218.

The number of monitors 214-1, 214-2, . . . , 214-N can include a number of real user monitors (RUMs). The RUMs can record some or all of a user's interactions with an application. For example, the RUMs can record user selections and application responses. The RUMs can also determine if the application responses were an intended response of the application. For example, the RUMs can record that a user selected to view the user's checking account, the RUMs can determine if the application displayed the user's checking account information or if there was an error in response to the user's selection.

Each of the applications 212-1, 212-2, . . . , 212-N can be connected to a different network 215-1, 215-2, . . . , 215-N. For example, application 212-1 can utilize network 215-1 and application 212-2 can utilize network 215-2. The network parameters for network 215-1 and network 215-2 can be different for a variety of reasons. For example, a bandwidth of network 215-1 can be relatively low for application 212-1 compared to a bandwidth of network 215-2 for application 212-2.

As described herein, the different parameters between network 215-1 and network 215-2 can result in a different end user experience for real user customers of application 212-1 and 212-2 respectively. For example, a real user customer selection using application 212-1 can result in an error of the application 212-1 and a real user customer selection using application 212-2 can result in a correct response of the application 212-2.

Each of the applications 212-1, 212-2, ..., 212-N can be connected to a WAN 216. The number of monitors can utilize the WAN 216 to send information to the network manager 218.

The network manager 218 can receive information for each of the number of applications 212-1, 212-2, ..., 212-N. The information can include: network parameters for each of the number of applications 212-1, 212-2, ..., 212-N, location information for each of the number of applications 212-1, 212-2, ..., 212-N, a quantity for the number of applications 212-1, 212-2, ..., 212-N, a percentage of the number of applications 212-1, 212-2, ..., 212-N at a particular location and/or utilizing a particular network 215-1, 215-2, 215-N, etc.

The network manager 218 can utilize the information to simulate and/or provide a number of local area networks (LANs) 220-1, 220-2, ..., 220-N for a number of real user testers 222-1, 222-2, ..., 222-N. The number of real user testers 222-1, 222-2, ..., 222-N can use the same or similar version of the application as a number of real user customers using the number of applications 212-1, 212-2, ..., 212-N. A plurality of real user testers 222-1, 222-2, ..., 222-N can utilize the same LAN provided by the network manager 218. For example, real user testers 222-1 and 222-2 can each use LAN 220-1 for testing the application.

The network manger 218 can determine the number of real user testers 222-1, 222-2, ..., 222-N that can utilize a particular LAN. The network manager 218 can send a signal to a number of real user testers 222-1, 222-2, ..., 222-N to indicate to the real user testers a LAN to utilize while testing the application. In another example, the network manager 218 can automatically provide a particular LAN to the number of real user testers 222-1, 222-2, ..., 222-N. For example, a real user tester 222-1 can begin a testing session of the application and the network manager 218 can automatically provide LAN 220-1 to the real user tester 222-1 for the testing session.

The network manager 218 can provide the number of LANs 220-1, 220-2, ..., 220-N according to an application frequency. As described herein, the application frequency can be a number of applications that in a particular location compared to a total quantity of the number of applications. The network manager 218 can determine a percentage of applications that utilize a particular set of network parameters and provide a LAN 220-1, 220-2, ..., 220-N to the same percentage of real user testers 222-1, 222-2, ..., 222-N.

In some cases the network manager 218 can determine a number of application frequency thresholds. The number of application frequency thresholds can be utilized by the network manager 218 for providing a simulated network to the number of real user testers 222-1, 222-2, ..., 222-N.

In one example, the network manager 218 can determine that the application frequency for a particular location is above a predetermined threshold. In this example the network manager 218 can provide the number of real user testers 222-1, 222-2, ..., 222-N with the network parameters of the particular location. In this example, the application frequency above the predetermined threshold could indicate to the network manager that a majority of applications are utilizing the same network parameters and all of the number of real user testers 222-1, 222-2, ..., 222-N can utilize the same LAN.

In another example, the network manager 218 can determine that an application frequency for a particular location is below a predetermined threshold and none of the real user testers 222-1, 222-2, ..., 222-N may utilize a LAN with the network parameters of the particular location.

The number of real user testers 222-1, 222-2, ..., 222-N can include a number of employees (e.g., people) of the developer of the application. The number of real user testers 222-1, 222-2, ..., 222-N can perform a number of functions of the application utilizing the designated LAN 220-1, 220-2, ..., 220-N. For example, if there is a reported error that occurs from a particular selection, the number of real user testers 222-1, 222-2, ..., 222-N that are utilizing a LAN 220-1, 220-2, ..., 220-N with the same or similar network parameters can perform the particular selection as a test to determine if there is an error while utilizing the LAN 220-1, 220-2, ..., 220-N with the same or similar network parameters.

The system 210 can allow the number of real user testers 222-1, 222-2, ..., 222-N to test an application under the same or similar network conditions as a number of real user customers. Testing an application under the same or similar network conditions can enable a real user tester 222-1, 222-2, ..., 222-N to determine if an end user experience of a real user customer is due to the particular network parameters.

A determination that a particular set of network parameters are creating errors within an application can enable a development team to make changes to the application. In another example, the development team can develop new updates for the application based on the number of real user testers experience with LANs that can represent the network parameters of the real user customers who can receive the update.

Figure 3:
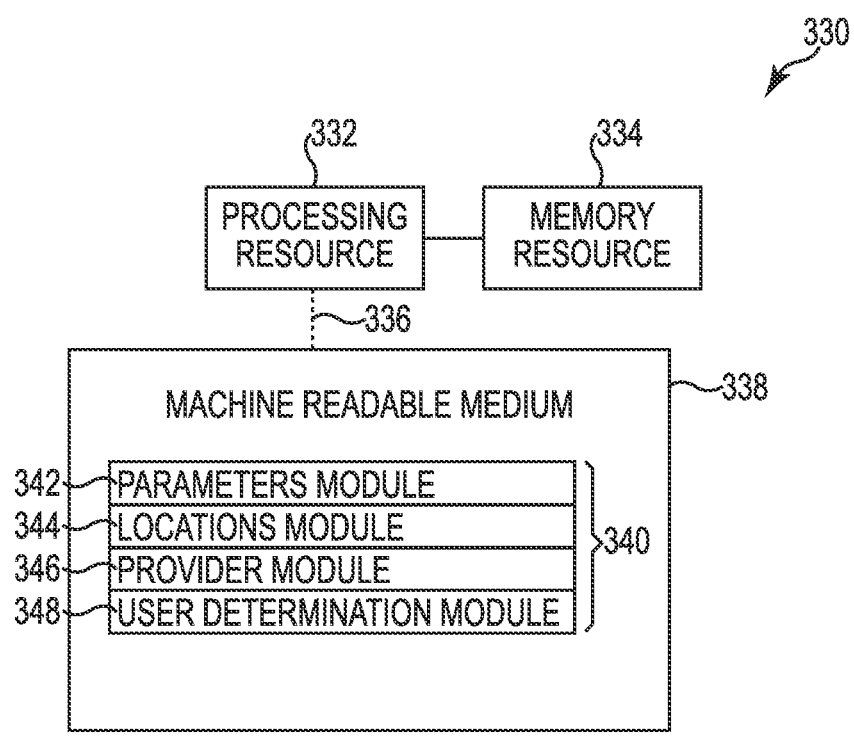
FIG. 3 illustrates a diagram of an example computing device according to the present disclosure.

FIG. 3 illustrates a diagram of an example computing device 330 according to the present disclosure. The computing device 330 can utilize software, hardware, firmware, and/or logic to provide a simulated network including a number of network parameters. The computing device 330 can include the network manager 218 as described in FIG. 2.

The computing device 330 can be any combination of hardware and program instructions configured to provide a simulated network. The hardware, for example can include one or more processing resources 332, machine readable medium (MRM) 340 (e.g., CRM, database, etc.). The program instructions (e.g., computer-readable instructions (CRI) 340) can include instructions stored on the MRM 338 and executable by the processing resources 332 to implement a desired function (e.g., determine response time metrics, determine throughput metrics, etc.).

MRM 338 can be in communication with a number of processing resources of more or fewer than 332. The processing resources 332 can be in communication with a tangible non-transitory MRM 338 storing a set of CRI 340 executable by one or more of the processing resources 332, as described herein. The CRI 340 can also be stored in remote memory managed by a server and represent an installation package that can be downloaded, installed, and executed. The computing device 330 can include memory resources 349, and the processing resources 332 can be coupled to the memory resources 349.

Processing resources 332 can execute CRI 340 that can be stored on an internal or external non-transitory MRM 338. The processing resources 332 can execute CRI 340 to perform various functions, including the functions described in FIG. 1 and FIG. 2. For example, the processing resources 332 can execute CRI 340 to implement the performance simulation module 212 from FIG. 2.

The CRI 340 can include a number of modules 342, 344, 346, 348. The number of modules 342, 344, 346, 348 can include CRI that when executed by the processing resources 332 can perform a number of functions.

The number of modules 342, 344, 346, 348 can be sub-modules of other modules. For example, a parameters module 342 and the locations module 344 can be sub-modules and/or contained within the network manager 218 from FIG. 2. In another example, the number of modules 342, 344, 346, 348 can comprise individual modules on separate and distinct computing devices.

A parameters module 342 can include CRI that when executed by the processing resources 332 can perform a number of parameter collection and/or recording functions. The parameters module 342 can collect the number of network parameters sent by a number of monitors (e.g., RUM). For example, the parameters module can receive the number of network parameters from the number of modules and save the number of network parameters in a database (e.g., memory resources 334, etc.).

A locations module 344 can include CRI that when executed by the processing resources 332 can perform a number of location determination functions. The locations module 344 can receive location information from the number of monitors. The locations module can utilize the location information associate a particular set of network parameters with a particular location.

A provider module 346 can include CRI that when executed by the processing resources 332 can perform a number of network simulation functions. The provider module 346 can provide a simulated network to a number of real user testers as described herein. The provider module 332 can provide the simulated network with a number of network parameters to the number of real user testers in proportion to the application frequency for the number of network parameters.

A user determination module 348 can include CRI that when executed by the processing resources 332 can perform a number of user determination functions. The user determination module 348 can determine a number of real user testers. The user determination module 348 can also collect user information for the number of applications at the number of locations. For example, the user determination module 348 can receive user information for a particular application and determine an amount of time that a particular application at a particular location is in use.

A non-transitory MRM 338, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory MRM 338 can be integral, or communicatively coupled, to a computing device, in a wired and/or a wireless manner. For example, the non-transitory MRM 338 can be an internal memory, a portable memory, a portable disk, or a memory associated with another computing resource (e.g., enabling CRIs to be transferred and/or executed across a network such as the Internet).

The MRM 338 can be in communication with the processing resources 332 via a communication path 336. The communication path 336 can be local or remote to a machine (e.g., a computer) associated with the processing resources 332. Examples of a local communication path 336 can include an electronic bus internal to a machine (e.g., a computer) where the MRM 338 is one of volatile, non-volatile, fixed, and/or removable storage medium in communication with the processing resources 332 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 336 can be such that the MRM 338 is remote from the processing resources e.g., 332, such as in a network connection between the MRM 338 and the processing resources (e.g., 332). That is, the communication path 336 can be a network connection. Examples of such a network connection can include a local area network (LAN), wide area network (WAN), personal area network (PAN), and the Internet, among others. In such examples, the MRM 338 can be associated with a first computing device and the processing resources 332 can be associated with a second computing device (e.g., a Java® server). For example, a processing resource 332 can be in communication with a MRM 338, wherein the MRM 338 includes a set of instructions and wherein the processing resource 332 is designed to carry out the set of instructions.

The processing resources 332 coupled to the memory resources 334 can execute CRI 340 to determine an application frequency of an application for each of a plurality of locations based on a total application distribution. The processing resources 332 coupled to the memory resources 334 can also execute CRI 340 to record a number of network parameters for each of the plurality of locations. The processing resources 332 coupled to the memory resources 334 can also execute CRI 340 to determine a number of current real users accessing a simulated local area network to test the application. Furthermore, the processing resources 332 coupled to the memory resources 334 can execute CRI 340 to provide a simulated local area network that simulates the number of network parameters for each of the plurality of locations for the number of current real users utilizing the application, wherein the number of network parameters are proportional to the application frequency for each of the plurality of locations.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for providing a simulated network, comprising:
    utilizing a processor to execute instructions located on a non-transitory medium for:
        collecting a number of network parameters for a plurality of locations;
        determining an application frequency of an application for the plurality of locations, wherein the application frequency is a percentage value of a total number of users utilizing the application at each of the plurality of locations; and
        providing a simulated network with the number of network parameters to a number of testers of the application, wherein the number of network parameters are provided proportionally to the application frequency.

2. The method of claim 1, wherein determining an application frequency includes calculating a percentage of the application used at the plurality of locations.

3. The method of claim 1, wherein providing the simulated network includes providing a number of network parameters for a portion of the number of testers that correspond to the application frequency of the number of network parameters.

4. The method of claim 1, further comprising communicating with an end point of the application at a particular location to determine a bandwidth at the particular location.

5. The method of claim 1, further comprising associating each of the number of network parameters with a percentage of users that experience the number of network parameters.

6. The method of claim 1, wherein providing the simulated network includes determining a portion of the testers to provide a number of network parameters that correspond to a specific location of the plurality of locations.

7. A non-transitory computer-readable medium storing a set of instructions executable by a processor to cause a computer to:
    record a number of network parameters for an application operating on a network;
    determine a percentage of application users that utilize the number of network parameters, wherein the percentage of application users includes a percentage value of a total number of users utilizing the application on a plurality of networks; and
    provide a simulated network comprising the number of network parameters to a number of real user testers proportional to the percentage of application users that utilize the number of network parameters.

8. The medium of claim 7, wherein the number of network parameters include network latency, network packet loss, and network bandwidth.

9. The medium of claim 7, wherein the number of real user testers are connected to the same local area network.

10. The medium of claim 7, wherein the number of real user testers that are utilizing a particular simulated network dynamically changes to corresponding changes in the percentage of application users that utilize a network with particular network parameters.

11. The medium of claim 7, wherein the number of real user testers perform a variety of functions with the application utilizing the provided network parameters.

12. A system for testing an application, the system comprising a processing resource in communication with a non-transitory computer readable medium, wherein the non-transitory computer readable medium includes a set of instructions and wherein the processing resource is designed to carry out the set of instructions to:
    determine an application frequency of an application for each of a plurality of locations based on a total application distribution, wherein the application frequency is a percentage value of a number of users utilizing the application at each of the plurality of locations;
    record a number of network parameters for each of the plurality of locations;
    determine a number of current real users accessing a simulated local area network to test the application; and
    provide a simulated local area network that simulates the recorded number of network parameters for each of the plurality of locations such that the number of current real users utilizing the application is proportional to the application frequency for each of the plurality of locations.

13. The computing system of claim 12, wherein the number of network parameters for each of the plurality of locations includes information identifying each of the plurality of locations.

14. The computing system of claim 12, further including the processing resource designed to carry out the set of instructions to determine a portion of the plurality of locations where the application frequency is above a predetermined threshold.

15. The computing system of claim 14, wherein the portion of the plurality of locations where the application frequency is above the predetermined threshold is used to provide the simulated network.

16. The computing system of claim 12, including the processing resource designed to carry out the set of instructions to record the number of network parameters for each of the plurality of locations including a bandwidth that affects a performance of the application.

17. The computing system of claim 12, including the processing resource designed to carry out the set of instructions to record the number of network parameters for each of the plurality of locations, via a number of monitors, during utilization of the application.

18. The computing system of claim 12, including the processing resource designed to carry out the set of instructions to calculate the application frequency by comparing a subset of the number of users utilizing the application with a first network to the number of users utilizing the application.

19. The computing system of claim 12, including the processing resource designed to carry out the set of instructions to:
    determine a number of reported problems relating to the application; and
    determine a location of the number of reported problems.

20. The computing system of claim 19, including the processing resource designed to carry out the set of instructions to:
    determine a number of network parameters for the location of the number of reported problems; and
    provide the simulated local area network that simulates the number of network parameters for the location of the number of reported problems such that the number of current real users utilizing the application is greater than proportional to the application frequency.

* * * * *